United States Patent
Kim et al.

(10) Patent No.: US 8,971,686 B2
(45) Date of Patent: Mar. 3, 2015

(54) METHOD AND APPARATUS FOR MANAGING DIGITAL CONTENTS AND METHOD AND APPARATUS FOR EXECUTING DIGITAL CONTENTS ACCORDING TO PLAYBACK POSITIONS

(75) Inventors: Kwang-hyuk Kim, Suwon-si (KR); Sung-wook Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1085 days.

(21) Appl. No.: 12/237,508

(22) Filed: Sep. 25, 2008

(65) Prior Publication Data
US 2009/0304363 A1 Dec. 10, 2009

(30) Foreign Application Priority Data
Jun. 4, 2008 (KR) .................. 10-2008-0052657

(51) Int. Cl.
| | |
|---|---|
| H04N 5/765 | (2006.01) |
| H04N 21/432 | (2011.01) |
| G11B 27/10 | (2006.01) |
| G11B 27/32 | (2006.01) |
| H04N 5/76 | (2006.01) |
| H04N 21/462 | (2011.01) |
| H04N 21/845 | (2011.01) |

(52) U.S. Cl.
CPC .......... *H04N 21/4325* (2013.01); *G11B 27/105* (2013.01); *G11B 27/322* (2013.01); *H04N 5/76* (2013.01); *H04N 21/462* (2013.01); *H04N 21/8455* (2013.01)
USPC ............. 386/200; 386/68; 386/239; 386/240; 386/241; 386/248

(58) Field of Classification Search
CPC .................. H04N 21/4622; H04N 21/23614; H04N 21/4532; H04N 21/47217; H04N 21/6582; H04N 5/445; H04N 21/25; H04N 21/262; H04N 21/27; H04N 21/458; H04N 21/478; H04N 21/488
USPC .................................... 386/68, 239–241, 248
See application file for complete search history.

(56) References Cited

U.S. PATENT DOCUMENTS
| | | |
|---|---|---|
| 2004/0008970 A1 | 1/2004 | Junkersfeld et al. |
| 2004/0039911 A1* | 2/2004 | Oka et al. .................... 713/175 |

(Continued)

FOREIGN PATENT DOCUMENTS
| | | |
|---|---|---|
| KR | 10-2006-0055422 A | 5/2006 |

OTHER PUBLICATIONS
OCAP1.0 Profile, "OpenCable Application Platform Specifications," OC-SP-OCAP1.0.1-070824, Part 1, pp. 1-315, Aug. 24, 2007.

(Continued)

*Primary Examiner* — Mohammad A Siddiqi
(74) *Attorney, Agent, or Firm* — Sughrue Mion, PLLC

(57) ABSTRACT

Provided are a method and an apparatus for managing digital contents and a method and an apparatus for executing digital contents according to playback positions. The method for managing digital contents includes inputting digital contents from a digital contents provider, inputting playback positions of the digital contents at which at least one application will perform an operation, and generating a list of playback positions in which the playback positions are recorded, based on attribute information on the application.

23 Claims, 8 Drawing Sheets

(56) References Cited

U.S. PATENT DOCUMENTS

| | | | |
|---|---|---|---|
| 2006/0026664 A1* | 2/2006 | Pierre et al. | 725/134 |
| 2007/0089156 A1* | 4/2007 | Ikeda et al. | 725/135 |
| 2007/0136392 A1* | 6/2007 | Oh et al. | 707/201 |
| 2007/0220564 A1* | 9/2007 | Yano et al. | 725/86 |
| 2007/0286584 A1* | 12/2007 | Yukimatsu | 386/124 |
| 2008/0092168 A1* | 4/2008 | Logan et al. | 725/44 |
| 2008/0124056 A1* | 5/2008 | Concotelli | 386/124 |
| 2009/0172751 A1* | 7/2009 | Aldrey et al. | 725/87 |
| 2009/0235312 A1* | 9/2009 | Morad et al. | 725/44 |

OTHER PUBLICATIONS

OCAP1.0 Profile, "OpenCable Application Platform Specifications," OC-SP-OCAP1.0.1-070824, Part 2, pp. 316-629, Aug. 24, 2007.

OCAP Digital Video Reorder (DVR), "OpenCable Application Platform Specifications OCAP Extensions," OP-SP-OCAP-DVR-I04-071220, Dec. 20, 2007.

Communications, dated Apr. 23, 2014, issued by the Korean Intellectual Property Office in counterpart Korean Application No. 10-2008-0052657.

* cited by examiner

FIG. 8A
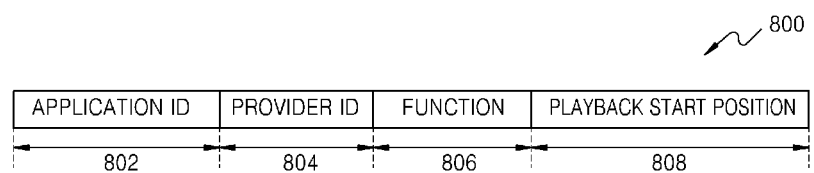
FIG. 8B
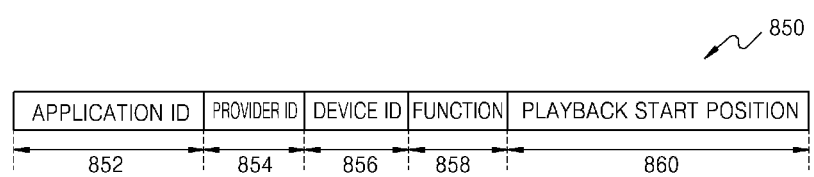
FIG. 9
| APPLICATION ID | PROVIDER ID | FUNCTION | PLAYBACK START POSITION |
|---|---|---|---|
| 1000 | 50 | NONE | 100 |
| 2000 | 30 | NONE | 1000 |
| 2001 | 10 | NONE | 5000 |
| 3002 | 10 | NONE | 100000 |

US 8,971,686 B2

METHOD AND APPARATUS FOR MANAGING DIGITAL CONTENTS AND METHOD AND APPARATUS FOR EXECUTING DIGITAL CONTENTS ACCORDING TO PLAYBACK POSITIONS

CROSS-REFERENCE TO RELATED PATENT APPLICATIONS

This application claims priority from Korean Patent Application No. 10-2008-0052657, filed on Jun. 4, 2008, in the Korean Intellectual Property Office, the disclosure of which is incorporated herein in its entirety by reference.

BACKGROUND OF THE INVENTION

1. Field of the Invention

Apparatuses and methods consistent with the present invention relate to digital contents management and execution, and more particularly, to management and execution according to playback positions of digital contents that an application intends to access.

2. Description of the Related Art

As digital broadcast technology has developed with Information Technology (IT), representative types of data broadcast technologies, such as OpenCable Application Platform (OCAP) or Multimedia Home Product (MHP), have become widely used in a home network that is constituted by a variety of types of multimedia devices in a user's house as well as in a Personal Video Recorder (PVR). As data broadcast technology develops, types of contents that a user is able to interact with by using applications provided by data broadcast have grown such that a user can now record contents and can gain access to remote contents that exist in the home network.

FIG. 1A illustrates related art digital broadcast contents.

In related art digital broadcast, when digital contents 100 for broadcast include program contents 110 and 114 and advertising contents 112 and a user has viewed contents up to a current viewing position 120 of the digital contents 100, the user cannot any longer access contents 122 prior to the current viewing position 120 and can access only contents 124 of the current viewing position 120 at a predetermined time. Therefore, even if the user wants to play back the previously played contents 122, in conventional digital broadcast, the user is not able to.

FIG. 1B illustrates digital broadcast contents using PVR technology.

A technology for recording broadcast contents so that a user can view desired broadcast contents at an arbitrary time has been developed. This is being developed in the form of PVR technology. In FIG. 1B, when digital contents 100 are recorded using PVR technology and the recorded digital contents 100 are played back using PVR technology, the recorded digital contents 100 begin to be played back from a start position 130.

In this case, when the user views the recorded contents up to a current viewing position 140, views other contents and then wants to view the recorded contents 100 again, the contents 100 are not played back from the current viewing position 140 and are instead played back again from the start position 130.

FIG. 2 illustrates conventional digital contents with regards to playback positions.

In order to solve the problems of FIGS. 1A and 1B, a technology for designating a playback start position with respect to digital contents has been developed. The playback start position is provided to and is used in an application for data broadcast by using a format setting a media time of the digital contents. Thus, when the user records broadcast contents 200 including broadcast program contents 210 and 214 and advertising contents 212, designates a playback start position 220, stops playback of the digital contents 200 and wants to play back the broadcast contents 200, the user can view the broadcast contents 200 again by playing back the broadcast contents from the playback start position 220.

FIG. 3 illustrates the case when digital broadcast contents are used by a plurality of applications.

By setting a playback start position to a media time of recording contents, the playback start position of the recording contents can be set. However, when there is one or more subjects that want to set a playback start position in this manner, a plurality of desired playback start positions may also be used. In other words, a Digital Video Recorder (DVR) application sets a playback start position 320 in a program 310 of digital contents 300, and a Digital Program Insertion (DPI) application inserts advertising contents in a playback start position 330.

FIG. 4 illustrates conflict between a plurality of applications with respect to digital broadcast contents.

In current technology for designating a playback start position, when there is a request to set the playback start position of digital contents, all information cannot be accepted in only one playback position. In other words, when a DVR application 410 sets a playback position in advance but a DPI application 420 later sets a desired playback position, the playback position that is set by the DVR application 410 in advance is updated to the playback position that is desired by the DPI application 420. Similarly, when a home network application 430 also sets a playback position, the playback position that is set by the DVR application 410 or the DPI application 420 may be changed. Therefore, when one or more requests to set a playback position exists in one stream of digital contents, conflict between applications or playback positions occurs.

SUMMARY OF THE INVENTION

The present invention provides a method and an apparatus for managing digital contents and a method and an apparatus for executing digital contents according to playback positions, using playback positions of digital contents that an application intends to access, the playback positions are identified in consideration of attributes of the application to execute digital contents so that the digital contents can be managed and executed according to the playback positions.

The present invention also provides a method and an apparatus for executing digital contents and a method and an apparatus for executing digital contents according to playback position, in which, when digital contents are executed by at least one application, playback positions of the digital contents that an application intends to access are not separately stored for each of a plurality of applications but are integrally managed, and integrally-managed playback position information is used efficiently.

According to an aspect of the present invention, there is provided a method for managing digital contents according to playback positions, including: inputting digital contents from a digital contents provider; inputting playback positions of the digital contents at which at least one application will perform a predetermined operation; and generating a list of playback positions at which the playback positions are recorded, based on attribute information on the application.

In the generating of the list of playback positions, the playback positions may be recorded in the list of playback positions according to identification information on at least one application that accesses the playback positions, which is one kind of attribute information on the application.

In the generating of the list of playback positions, the playback positions may be recorded in the list of playback positions according to information that indicates functions performed by the application on the playback positions, which is one kind of attribute information on the application.

In the generating of the list of playback positions, the playback positions may be recorded in the list of playback positions according to identification information on a provider of the application, which is one kind of attribute information on the application.

In the generating of the list of playback positions, the playback positions may be recorded in the list of playback positions according to identification information on a user who wants to access the playback positions by using the application, which is one kind of attribute information on the application.

The generating of the list of playback positions may include inserting the list of playback positions in data in which the digital contents are stored.

The generating of the list of playback positions may include storing the list of playback positions as separate pieces of data associated with data in which the digital contents are stored.

According to another aspect of the present invention, there is provided a method for executing digital contents according to playback positions, including: selecting digital contents that are to be executed by a current application, from among at least one digital contents; extracting a list of playback positions at which playback positions of the digital contents at which at least one application will perform a predetermined operation are recorded based on attribute information on the application; searching a playback position for the current application from the extracted list of playback positions by using attributes of the current application; and allowing the current application to access the searched playback position of the digital contents.

The searching of the playback position may include determining a playback position for the current application by comparing identification information on applications of the list of playback positions with identification information on the current application.

The searching of the playback position may include determining a playback position for the current application by using information that indicates function performed by an application on each playback position of the list of playback positions.

The searching of the playback position may include determining a playback position of the list of playback positions for the current application by using identification information on a provider of the application.

The searching of the playback position may include determining a playback position of the list of playback positions for the current application by using identification information on a user who wants to access the playback positions by using the application.

The extracting of the list of playback positions may include extracting the list of playback positions from data in which the digital contents are stored.

The extracting of the list of playback positions may include extracting the list of playback positions from separate data associated with data in which the digital contents are stored.

According to another aspect of the present invention, there is provided an apparatus for managing digital contents according to playback positions, including: a digital contents inputting unit to which digital contents are input from a digital contents provider; a playback position inputting unit to which playback positions of the digital contents at which at least one application will perform a predetermined operation are input; and a playback position list generating unit generating a list of playback positions in which the playback positions are recorded, based on attribute information on the application.

In the playback position list generating unit, the playback positions may be recorded in the list of playback positions according to identification information on at least one application that accesses the playback positions, which is one kind of attribute information on the application.

In the playback position list generating unit, the playback positions may be recorded in the list of playback positions according to information that indicates functions performed by the application on the playback positions, which is one kind of attribute information on the application.

In the playback position list generating unit, the playback positions may be recorded in the list of playback positions according to identification information on a provider of the application, which is one kind of attribute information on the application.

In the playback position list generating unit, the playback positions may be recorded in the list of playback positions according to identification information on a user who wants to access the playback positions by using the application, which is one kind of attribute information on the application.

The playback position list generating unit may insert the list of playback positions in data in which the digital contents are stored.

The playback position list generating unit may store the list of playback positions as separate pieces of data associated with data in which the digital contents are stored.

According to another aspect of the present invention, there is provided an apparatus for executing digital contents according to playback positions, including: a digital contents selecting unit selecting digital contents that are to be executed by a current application, from among at least one digital contents; a playback position list extracting unit extracting a list of playback positions in which playback positions of the digital contents at which at least one application will perform a predetermined operation are recorded based on attribute information on the application; a playback position searching unit searching for a playback position for the current application from the extracted list of playback positions by using attributes of the current application; and an application accessing unit allowing the current application to access the searched playback position of the digital contents.

The playback position searching unit may determine a playback position for the current application by comparing identification information on applications of the list of playback positions with identification information on the current application.

The playback position searching unit may determine a playback position for the current application by using information that indicates functions performed by an application on each playback position of the list of playback positions.

The playback position searching unit may determine a playback position of the list of playback positions for the current application by using identification information on a provider of the application.

The playback position searching unit may determine a playback position of the list of playback positions for the current application by using identification information on a user who wants to access the playback positions by using the application.

The playback position list extracting unit may extract the list of playback positions from data in which the digital contents are stored.

The playback position list extracting unit may extract the list of playback positions from separate data associated with data in which the digital contents are stored.

According to another aspect of the present invention, there is provided a computer readable medium in which a program for executing the method for managing digital contents according to playback positions is recorded.

According to another aspect of the present invention, there is provided a computer readable medium in which a program for executing the method for executing digital contents according to playback positions is recorded.

BRIEF DESCRIPTION OF THE DRAWINGS

The above and other aspects of the present invention will become more apparent by describing in detail exemplary embodiments thereof with reference to the attached drawings in which:

FIG. 8A illustrates items of the list of playback positions according to an exemplary embodiment of the present invention;

FIG. 8B illustrates items of the list of playback positions according to another exemplary embodiment of the present invention;

FIG. 9 illustrates the list of playback positions according to an exemplary embodiment of the present invention;

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
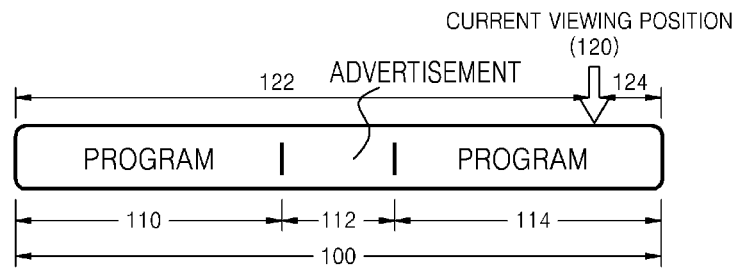
FIG. 1A illustrates related art digital broadcast contents.
Figure 1B:
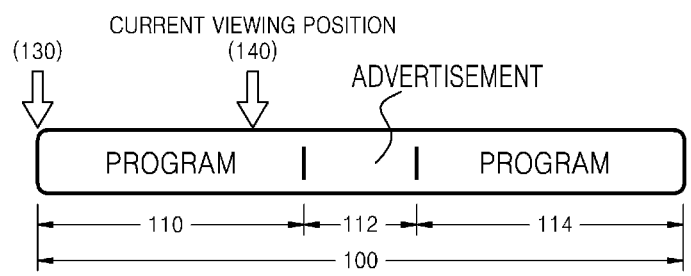
FIG. 1B illustrates digital broadcast contents using a Personal Video Recorder (PVR) technology.
Figure 2:
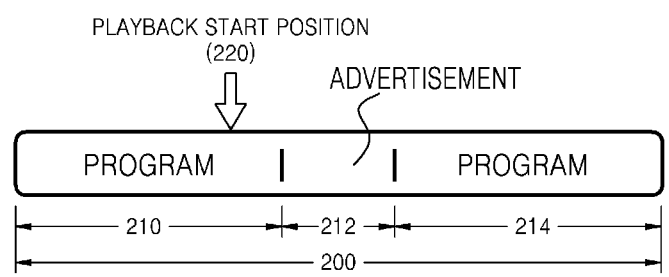
FIG. 2 illustrates related art digital contents with regards to playback positions.
Figure 3:
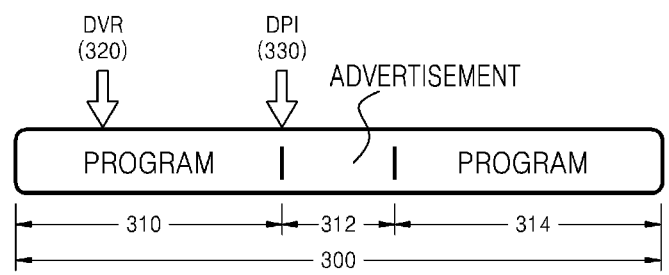
FIG. 3 illustrates the case in which digital broadcast contents are used by a plurality of applications.
Figure 4:
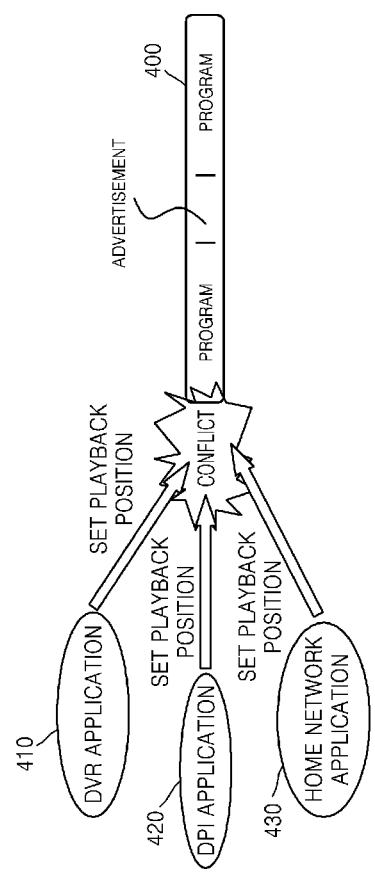
FIG. 4 illustrates conflict between a plurality of applications with respect to digital broadcast contents.
Figure 5:
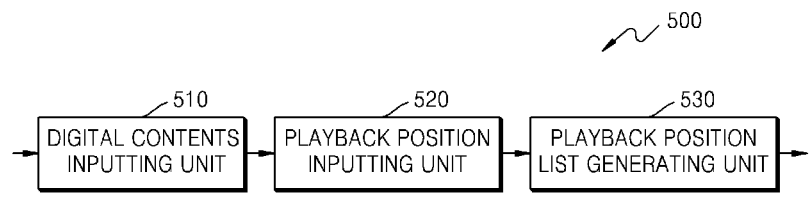
FIG. 5 is a block diagram of an apparatus for managing digital contents according to an exemplary embodiment of the present invention.

FIG. 5 is a block diagram of an apparatus for managing digital contents according to an exemplary embodiment of the present invention. Referring to FIG. 5, an apparatus 500 for managing digital contents according to an exemplary embodiment of the present invention comprises a digital contents inputting unit 510, a playback position inputting unit 520, and a playback position list generating unit 530.

Digital contents are input to the digital contents inputting unit 510 from a digital contents provider, and the digital contents inputting unit 510 outputs the digital contents to the playback position inputting unit 520. There may be a plurality of digital contents providers providing digital contents, or a plurality of digital contents may also be provided. Types of digital contents according to the present invention are not limited, and may include contents for recording and playback, general Internet contents, and contents provided through other Video on Demand (VOD).

Playback positions at which at least one application will perform a predetermined operation, of the digital contents input from the digital contents inputting unit 510, are input to the playback position inputting unit 520 and the input playback position are in turn output to the playback position list generating unit 530. For example, a predetermined operation could be one of playback, recording and editing operations. The playback positions are time points at which an application intends to perform a predetermined operation on the digital contents or a position of data in which the digital contents are recorded. The playback positions may also be predetermined temporal positions, such as a media time of digital contents that are desired by an application and a playback start time, etc.

When there are a plurality of digital contents input to the digital contents inputting unit 510, the digital contents that are desired by the application are first selected, and a playback position of the selected digital contents is determined. Each of the playback positions may be identified based on attributes of applications. For example, each of the playback positions may be identified according to at least one of identification numbers, types, functions, users, and providers of applications.

The playback positions are input to the playback position list generating unit 530 from the playback position inputting unit 520. The playback position list generating unit 530 generates and outputs the list of playback positions in which playback positions are recorded, based on attribute information on applications. The list of playback positions may be recorded in a data unit, such as corresponding digital contents, or may also be recorded in a separate data unit.

In the list of playback positions, playback positions are recorded based on attribute information on applications. Attribute information on applications may include at least one of identification information on applications that access each of the playback positions, functions to be performed by applications on corresponding playback positions, identification information on application providers, and identification information on users who want to access corresponding playback positions through applications.

Therefore, the apparatus 500 for managing digital contents according to an exemplary embodiment of the present invention may set one or more playback positions of one digital contents that are differentiated according to attribute of applications.

Figure 6:
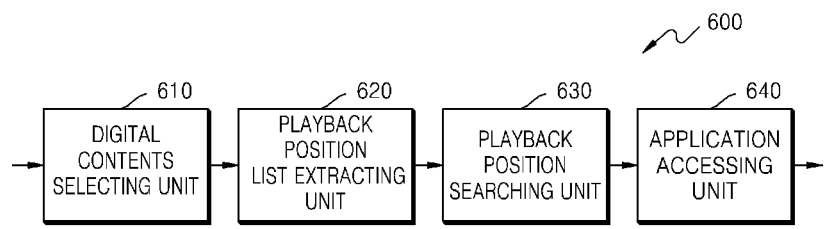
FIG. 6 is a block diagram of an apparatus for executing digital contents according to an exemplary embodiment of the present invention.

FIG. 6 is a block diagram of an apparatus for executing digital contents according to an exemplary embodiment of the present invention. Referring to FIG. 6, an apparatus 600 for executing digital contents according to an exemplary embodiment of the present invention comprises a digital contents selecting unit 610, a playback position list extracting unit 620, a playback position searching unit 630, and an application accessing unit 640.

The digital contents selecting unit 610 selects digital contents on which a current application intends to perform a predetermined operation, from among at least one digital content and outputs the selected digital contents to the playback position list extracting unit 620.

The playback position list extracting unit 620 extracts the list of playback positions of the digital contents selected by the digital contents selecting unit 610 and outputs the extracted list of playback positions to the playback position searching unit 630. When at least one application intends to perform a predetermined operation on the digital contents, playback positions that are classified according to attribute information on applications are recorded in the list of playback positions.

The list of playback positions may be extracted from data in which the digital contents are stored, or may also be extracted from data that is stored separately from the data in which the digital contents are stored.

The list of playback positions is input to the playback position searching unit 630 from the playback position extracting unit 620, the playback position searching unit 630 searches for a playback position of the digital contents that a current application intends to access, from the list of playback positions by using the attribute of the current application, and outputs the searched playback position to the application accessing unit 640.

The playback position searching unit 630 may extract attribute information from the current application in advance, so as to search and determine the playback position that is appropriate to the attribute of the current application from the list of playback positions. Alternatively, the playback position searching unit 630 may search an appropriate playback position from the list of playback positions by using attribute information that is provided from the current application in advance.

When an item regarding the playback positions that are appropriate to the attribute of the current application is searched from the list of playback positions, a playback position that matches with the item may be a playback position for the current application. Therefore, an operation of comparing predetermined information on the list of playback positions with attribute information on the current application is required.

Attribute information on applications may include identification information on applications, identification information on application providers, and identification information on users and functions of applications.

The application accessing unit 640 allows the current application to access a playback position of the digital contents based on the playback positions input from the playback position searching unit 630. Applications that access desired playback positions may perform operations.

Figure 7:
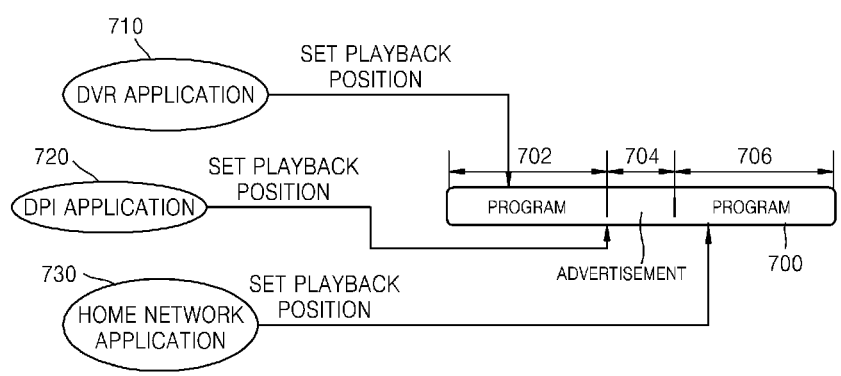
FIG. 7 illustrates the case when playback positions of a plurality of applications are set to digital contents.

FIG. 7 illustrates the case when playback positions of a plurality of applications are set to digital contents.

For example, in digital broadcast, digital contents 700 that are provided by a digital contents provider may include broadcast program contents 702 and 706 and advertising contents 704 inserted between broadcast programs.

Playback positions may be predetermined positions of digital contents that an application intends to access when it processes digital contents and then processes the same digital contents again. Alternatively, playback positions may be predetermined positions of the digital contents, which are recommended by other users that have used a predetermined application to access it, and may be designated in advance before the application uses corresponding digital contents.

The DVR application 710 sets a playback position to the digital contents 700 so as to record the broadcast program contents 702 and to play back the broadcast program contents 702 from a desired playback time point at a desired time. The DPI application 720 sets a playback position to the digital contents 700 so as to play back the advertising contents 704 by inserting the advertising contents 704 between the broadcast program contents 702 and 706. A home network application 730 sets a playback position to the digital contents 700 so as to use the broadcast program contents 706.

Each of the playback positions must be identified according to a predetermined reference so that a plurality of playback positions can be accurately set to one digital contents 700 by using various applications.

FIG. 8A illustrates items of the list of playback positions according to an exemplary embodiment of the present invention.

Information on playback positions, which is a reference for classifying playback positions of digital contents according to application attributes, etc., may include an application identification (ID) 802 which indicates identification information on applications, a provider ID 804 which indicates identification information on application providers, and a function 806 which indicates all types of applications according to functions of the applications. A playback start position 808 that is classified according to the application ID 802, the provider ID 804, and the function 806, is set. Thus, items 800 of the list of playback positions according to an exemplary embodiment of the present invention may include the application ID 802, the provider ID 804, the function 806, and the playback start position 808 that is classified according to the application ID 802, the provider ID 804, and the function 806.

FIG. 8B illustrates items of the list of playback positions according to another exemplary embodiment of the present invention.

In addition, playback positions may be classified according to a device ID 856 which indicates identification information on a device in which an application is installed. Thus, items 850 of the list of playback positions according to an exemplary embodiment of the present invention may include an application ID 852, a provider ID 854, the device ID 856, a function 858, and a playback start position 860 that is classified according to the application ID 852, the provider ID 854, the device ID 856, and the function 858.

FIG. 9 illustrates a list of playback positions according to an exemplary embodiment of the present invention. A list 900 of playback positions according to an exemplary embodiment of the present invention comprises an application ID 910, a provider ID 920, a function 930, and a playback start position 940. In other words, the list 900 of playback positions indicates that an application having an application ID '1000', a provider ID '50', and a function value 'none' sets a playback start position to a playback position '100' of digital contents.

Playback positions are input to the playback position inputting unit 520 of the apparatus 500 for managing digital contents so that an application having an application ID '1000', a provider ID '50', and a function value 'none' can set a playback start position to a playback position '100'. The playback position list generating unit 530 generates the list 900 of playback positions by using application information and a playback start position 940 according to attribute items 910, 920, and 930 of the application.

Also, the playback position list extracting unit 620 of the apparatus 600 for executing digital contents extracts the list 900 of playback positions associated with the digital contents.

The playback position searching unit 630 compares attribute information on a current application to perform a predetermined operation on the digital contents with information on attribute items 910, 920, and 930 of the application on the list 900 of playback positions, thereby searching a desired playback position. The application accessing unit 640 allows the application to access the playback position that is searched as above.

Figure 10:
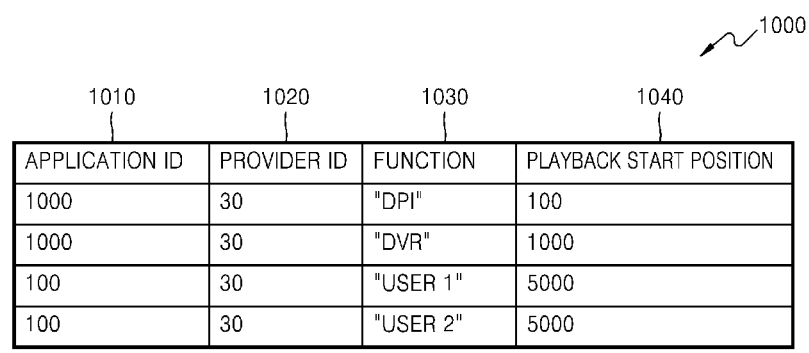
FIG. 10 illustrates the list of playback positions according to another exemplary embodiment of the present invention.

FIG. 10 illustrates the list of playback positions according to another exemplary embodiment of the present invention.

In the list 1000 of playback positions, a function 1030, which is one item, is specifically set. In other words, an application having an application ID '1000' and a provider ID '30' intends to set a playback position so as to perform a "DPI" function on a playback start position '100', i.e., an advertising insertion function, and sets a playback position so as to perform a "DVR" function, i.e., a recording and playback function, on a playback start position '1000'.

In addition, an application having an application ID '100' and a provider ID '30' sets a playback position to a playback start position '5000' by using a 'user 1' and sets a playback position to a playback start position '5000' by using a 'user 2'. In other words, even in the same application, if there are a plurality of users who want to use same application, a playback position may be separately set by each user.

Figure 11:
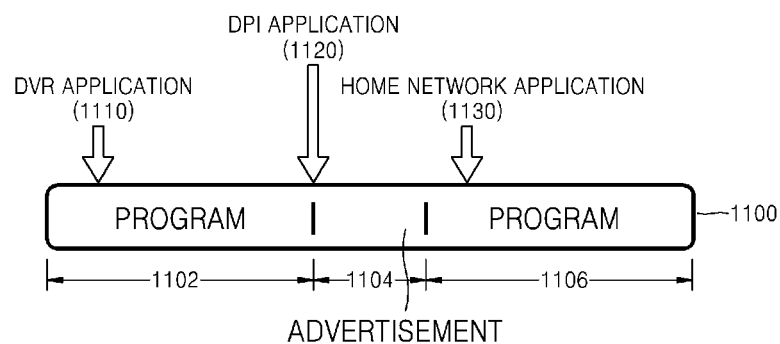
FIG. 11 illustrates digital contents in which playback positions of a plurality of applications are set, according to an exemplary embodiment of the present invention.

FIG. 11 illustrates digital contents in which playback positions of a plurality of applications are set, according to an exemplary embodiment of the present invention.

According to an exemplary embodiment of the present invention, a playback position 1110 of a DVR application is set in a predetermined position of a program contents 1102 of digital contents 1100, and a playback position 1120 of a DPI application is set in a start position of advertising contents 1104, and a playback position 1130 of a home network application is set in a predetermined position of program contents 1106.

The application accessing unit 640 of the apparatus 600 for executing digital contents according to an exemplary embodiment of the present invention allows the DVR application to play back recorded contents from the playback position 1110 of the program contents 1102. In addition, the application accessing unit 640 may allow the DPI application to insert advertising contents in the playback position 1120 of the DPI application. In addition, the application accessing unit 640 may allow the home network application to use digital contents from the playback position 1130 of the program contents 1106 for a predetermined purpose.

Figure 12:
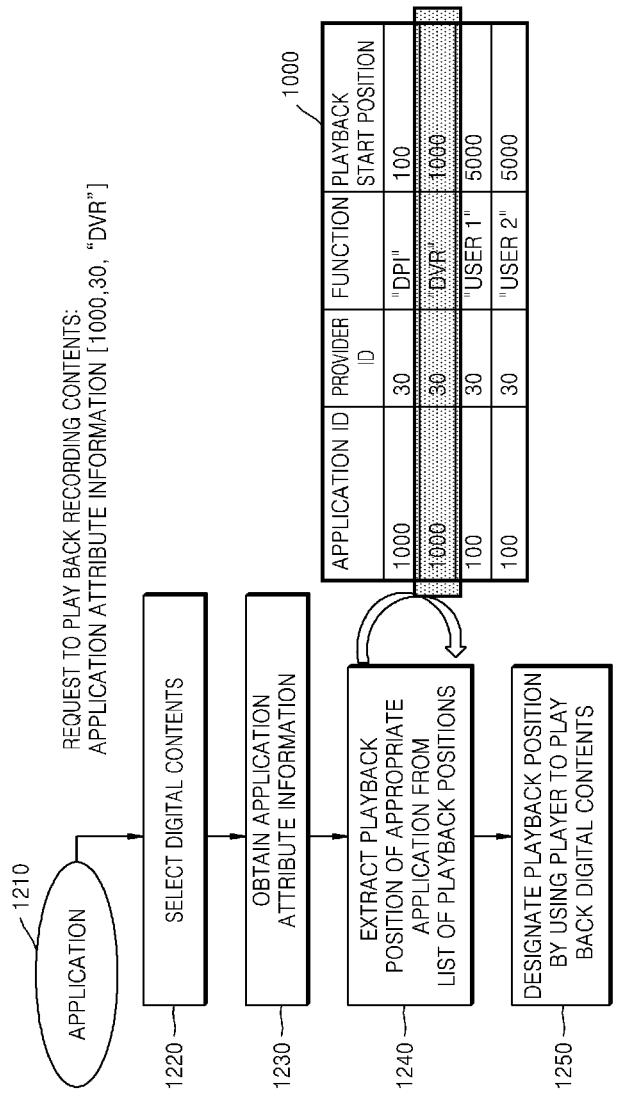
FIG. 12 illustrates an operation of accessing a predetermined playback position of digital contents, wherein the operation is performed by an application, by using an apparatus for executing digital contents, according to an exemplary embodiment of the present invention.

FIG. 12 illustrates an operation of accessing a predetermined playback position of digital contents, wherein the operation is performed by an application, by using an apparatus for executing digital contents according to an exemplary embodiment of the present invention.

A request to playback recording contents from the DVR application is input to the apparatus 600 for executing digital contents in operation 1210. According to the playback request, recording contents are selected from among digital contents of the apparatus 600 for executing digital contents in operation 1220. The DVR application has an attribute of an application ID '1000', a provider ID '30', and a function value "DVR", which are application attribute information. If corresponding recording contents are selected, the playback position list extracting unit 620 extracts the list of playback positions of the corresponding recording contents.

The playback position searching unit 630 obtains application attribute information on the DVR application in operation 1230. In other words, attribute information, such as an application ID '1000', a provider ID '30', and a function value "DVR", are extracted from the DVR application.

The playback position searching unit 630 searches and extracts a playback position that is appropriate to the extracted application attribute information from the list 100 of playback positions in operation 1240. In other words, the playback position that matches with the attribute information, such as an application ID '1000', a provider ID '30', and a function value "DVR", is searched and extracted from the list 100 of playback positions, thereby determining that a playback start position for the DVR application is '1000'.

The application accessing unit 640 allows the DVR application to access the playback position '1000', and a player on which the DVR application is installed, designates the playback position '1000' and plays back recorded digital contents from the playback position '1000' in operation 1250.

Figure 13:
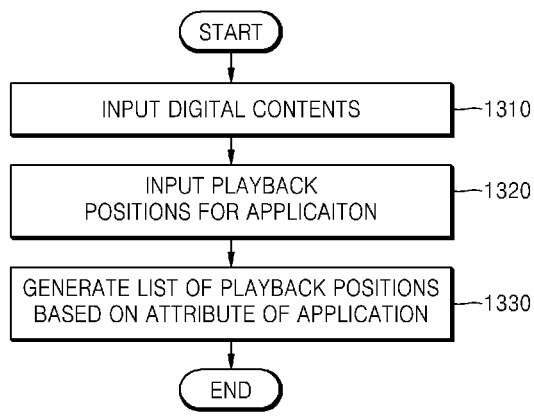
FIG. 13 is a flowchart illustrating a method for managing digital contents according to an exemplary embodiment of the present invention.

FIG. 13 is a flowchart illustrating a method for managing digital contents according to an exemplary embodiment of the present invention.

In operation 1310, digital contents are input from a digital contents provider.

In operation 1320, playback positions of digital contents at which at least one application will perform a predetermined operation, are input. Since playback positions at which the predetermined operation of at least one application is to be performed may be different, there may be several input playback positions.

In operation 1330, the list of playback positions in which playback positions are recorded, is generated based on attribute information on applications. Identification information on applications, identification information on application users, identification information on application providers, and identification information on apparatuses in which applications are installed may be considered as the attribute information on applications.

Figure 14:
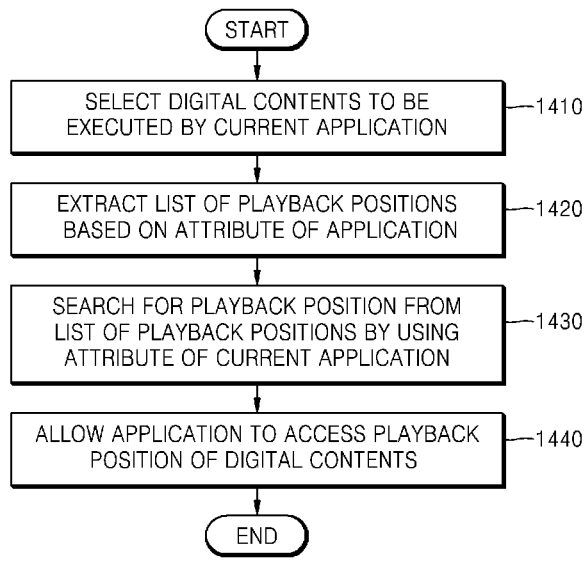
FIG. 14 is a flowchart illustrating a method for executing digital contents according to an exemplary embodiment of the present invention.

FIG. 14 is a flowchart illustrating a method for executing digital contents according to an exemplary embodiment of the present invention.

In operation 1410, digital contents that will be executed by a current application are selected from among at least one digital contents. Digital contents having a playback position that is set in advance for the current application may be selected.

In operation 1420, the list of playback positions, in which playback positions of the digital contents at which at least one application will perform a predetermined operation are recorded based on attribute information on the applications, is extracted. The list of playback positions may be extracted from data in which the digital contents are stored and may also be extracted from other data associated with data in which the digital contents are stored.

In operation 1430, a playback position for the current application is determined from the playback position that is extracted from the attribute of the current application. The attribute information on the current application is obtained, thereby searching for a playback position that is appropriate to the current application from the list of playback positions.

In operation 1440, the current application is allowed to access the searched playback position of the digital contents. A digital processing apparatus, in which the current application is installed, may designate the playback position that is determined by the searching and may play back digital contents that are desired by the current application.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Alternatively, in another exemplary embodiment, the invention can also be embodied as computer readable codes on a computer readable transmission medium, the computer readable transmission medium being carrier waves (such as data transmission through the Internet).

As described above, in the method and apparatus for managing digital contents by using a playback position according to exemplary embodiments of the present invention, accurate playback position information can be provided by classifying playback positions according to attributes of applications. Even when a plurality of playback positions are set, the playback positions are recorded according to various attribute information on applications so that, even when various applications process digital contents, each playback position is not arbitrarily changed.

In the method and apparatus for managing digital contents by using a playback position according to exemplary embodiments of the present invention, the applications can access digital contents at a desired playback position by using the playback positions that are classified according to attributes of applications.

In addition, when at least one application executes digital contents, a playback position of the digital contents that the application intends to access is not separately stored and instead is integrally recorded so that various playback position information can be managed and used efficiently.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for managing digital contents according to playback positions, the method comprising:
   inputting digital contents from a digital contents provider;
   inputting a plurality of playback positions in the digital contents at which at least one application performs a respective operation; and
   generating one list for the plurality of playback positions such that a playback position identification information for each of the plurality of playback positions is provided and corresponding attribute information specific to the respective playback position,
   wherein the attribute information comprises information that indicates at least one function performed by the at least one application on the playback position,
   wherein the respective operation of at least one application comprises a plurality of functions and the playback position identification information for each of the plurality of playback positions respectively corresponding to the plurality of functions is provided,
   wherein at least two of the plurality of functions are functions of the same application and the corresponding attribute information for said at least two of the plurality of functions comprises same application identification information,
   wherein the attribute information further comprises identification information of a respective user from a plurality of users who intends to access the same digital contents using one of at least two different applications from the respective playback position from among the plurality of playback positions, and
   wherein the list comprises a first playback position set by a first user and a second playback position set by a different second user, wherein the at least two different applications perform at least one of record and edit the same digital contents from the respective playback position.

2. The method of claim 1, wherein the attribute information further comprises identification information of a provider for the respective application for each of the plurality of playback positions.

3. The method of claim 1, wherein the generating the list of playback positions comprises inserting the list of playback positions in data in which the digital contents are stored and wherein the list is a separate table dedicated to managing information about the plurality playback positions.

4. A non-transitory computer readable medium in which a program for executing the method of claim 1 is recorded.

5. The method of claim 1, wherein the at least one function comprises recording the contents from the respective playback position and wherein the at least two different applications comprise a home network application which provides a user with access to the same digital contents and a DVR application which provides the user with access to the same digital contents.

6. The method of claim 5, wherein the attribute information identifies an additional function which comprises playing back the contents from the respective playback position by one of the different applications.

7. A method for executing digital contents according to playback positions, the method comprising:
   selecting digital contents that are to be executed by a current application, from among at least one digital contents;
   extracting one list comprising a plurality of playback positions for the selected digital contents, wherein the playback positions are positions at which at least one application comprising the current application performs a respective operation and wherein for each of the plurality of playback positions a playback position identification information is provided and corresponding attribute information specific to the respective playback position;
   searching in the extracted list for a playback position which corresponds to the current application;
   executing the operation corresponding to the searched playback position by allowing the current application to access the searched playback position in the digital contents,
   wherein the attribute information comprises information that indicates at least one function performed by the at least one application on the playback position,
   wherein the respective operation of at least one application comprises a plurality of functions and the playback position identification information for each of the plurality of playback positions respectively corresponding to the plurality of functions is provided,
   wherein at least two of the plurality of functions are functions of the same application and the corresponding attribute information for said at least two of the plurality of functions comprises same application identification information,
   wherein the attribute information further comprises identification information of a respective user from a plurality of users who intends to access the same digital contents using one of at least two different applications from the respective playback position from among the plurality of playback positions, and
   wherein the list comprises a first playback position set by a first user and a second playback position set by a different second user, wherein the at least two different applications perform at least one of record and edit the same digital contents from the respective playback position.

8. The method of claim 7, wherein the searching the playback position comprises determining a playback position for the current application by comparing the identification information of each of the different applications stored in the list with an identification information of the current application.

9. The method of claim 7, wherein the searching the playback position comprises determining a playback position for the current application by using information that indicates a function performed by an application on each playback position of the list of playback positions.

10. The method of claim 7, wherein the searching the playback position comprises determining a playback position for the current application by using identification information on a provider of the current application.

11. The method of claim 7, wherein the searching the playback position comprises determining a playback position for the current application by using identification information on a user who intends to access the playback positions by using the current application.

12. The method of claim 7, wherein the extracting the list of playback positions comprises extracting the list of playback positions from data in which the digital contents are stored.

13. A non-transitory computer readable medium in which a program for executing the method of claim 7 is recorded.

14. An apparatus for managing digital contents according to playback positions, the apparatus comprising:
a digital contents input interface, implemented by a processor, into which digital contents are input from a digital contents provider;
a playback position input interface, implemented by the processor, into which a plurality of playback positions in the digital contents at which at least one application performs a respective operation are input; and
a playback position list generator which generates one list for the plurality of playback positions such that a playback position identification information for each of the plurality of playback positions is provided and corresponding attribute information specific to the respective playback position,
wherein the playback position list generator comprises at least one hardware component;
wherein the attribute information comprises information that indicates at least one function performed by the at least one application on the playback position,
wherein the respective operation of at least one application comprises a plurality of functions and the playback position identification information for each of the plurality of playback positions respectively corresponding to the plurality of functions is provided,
wherein at least two of the plurality of functions are functions of the same application and the corresponding attribute information for said at least two of the plurality of functions comprises same application identification information,
wherein the attribute information further comprises identification information of a respective user from a plurality of users who intends to access the same digital contents using one of at least two different applications from the respective playback position from among the plurality of playback positions, and
wherein the list comprises a first playback position set by a first user and a second playback position set by a different second user, wherein the at least two different applications perform at least one of record and edit the same digital contents from the respective playback position.

15. The apparatus of claim 14, wherein the attribute information further comprises identification information on a provider of the at least one application.

16. The apparatus of claim 14, wherein the attribute information further comprises identification information on a user who intends to access the playback positions by using the at least one application.

17. The apparatus of claim 14, wherein the playback position list generator inserts the list of playback positions in data in which the digital contents are stored.

18. An apparatus for executing digital contents according to playback positions, the apparatus comprising:
a digital contents selector which selects digital contents that are to be executed by a current application, from among at least one digital contents;
a playback position list extractor which extracts one list of a plurality of playback positions in the selected digital contents, wherein the playback positions are positions at which at least one application comprising the current application performs a respective operation and wherein said one list comprises for each of the plurality of playback positions a playback position identification information and corresponding attribute information specific to the respective playback position;
a playback position searcher which searches the extracted one list for a playback position, from among the plurality of playback positions, which corresponds to the current application by identifying the playback positions using corresponding attribute information; and
an executor which executes the operation corresponding to the searched playback position by an application accessor which allows the current application to access the searched playback position in the digital contents,
wherein at least one of the playback position list extractor, the playback position searcher, and the executor comprises at least one hardware component;
wherein the attribute information comprises information that indicates at least one function performed by the at least one application on the playback position,
wherein the respective operation of at least one application comprises a plurality of functions and the playback position identification information for each of the plurality of playback positions respectively corresponding to the plurality of functions is provided,
wherein at least two of the plurality of functions are functions of the same application and the corresponding attribute information for said at least two of the plurality of functions comprises same application identification information,
wherein the attribute information further comprises identification information of a respective user from a plurality of users who intends to access the same digital contents using one of at least two different applications from the respective playback position from among the plurality of playback positions, and
wherein the list comprises a first playback position set by a first user and a second playback position set by a different second user, wherein the at least two different applications perform at least one of record and edit the same digital contents from the respective playback position.

19. The apparatus of claim 18, wherein the playback position searcher determines a playback position for the current application by comparing identification information of the different applications stored in said one list with identification information of the current application.

20. The apparatus of claim 18, wherein the playback position searcher determines a playback position for the current application by using information that indicates a function performed by an application on each playback position of the list of playback positions.

21. The apparatus of claim 18, wherein the playback position searcher determines a playback position for the current application by further using identification information of a provider of the current application also stored in said one list.

22. The apparatus of claim 18, wherein the playback position searcher determines a playback position for the current application by further using identification information of a user who intends to access the playback positions by using the current application.

23. The apparatus of claim 18, wherein the playback position list extractor extracts said one list from data in which the digital contents are stored.

* * * * *